United States Patent [19]

Parts et al.

[11] 4,093,684

[45] June 6, 1978

[54] SOLID SOLDERABLE POLYURETHANE DATA SIGNAL RECORDING MEDIUM

[75] Inventors: Leo P. Parts, Dayton; Edgar E. Hardy, Kettering, both of Ohio

[73] Assignee: Monsanto Research Corporation, St. Louis, Mo.

[21] Appl. No.: 817,894

[22] Filed: Jul. 21, 1977

Related U.S. Application Data

[63] Continuation of Ser. No. 409,515, Oct. 25, 1973, abandoned, which is a continuation of Ser. No. 864,160, Oct. 6, 1969, abandoned.

[51] Int. Cl.$^2$ .................... H05B 7/00; C08G 18/80; C08F 2/46; G01D 5/48
[52] U.S. Cl. .................... 264/25; 204/159.19; 204/159.2; 260/75 NA; 260/77.5 A; 260/37 N; 260/77.5 TB; 260/22 TN; 264/154; 346/76 L
[58] Field of Search .................... 204/159.19, 159.2; 260/77.5 TB, 75 NA, 77.5 A; 264/25, 154

[56] References Cited

U.S. PATENT DOCUMENTS

| | | | |
|---|---|---|---|
| 3,249,563 | 5/1966 | Balk | 260/22 |
| 3,256,524 | 6/1966 | Stauffer | 346/76 |
| 3,311,497 | 3/1967 | Park | 117/138.8 |
| 3,314,073 | 4/1967 | Becker | 346/76 |
| 3,441,939 | 4/1969 | Anderson | 346/1 |
| 3,549,733 | 12/1970 | Caddell | 264/25 |
| 3,594,261 | 7/1971 | Broerman | 161/62 |
| 3,824,118 | 7/1974 | Tsuboi et al. | 117/138.8 |

OTHER PUBLICATIONS

Kirk–Othmer, Encyclopedia of Chemical Technology, vol. 10, Interscience, N.Y. (1953) pp. 143, 144, 809.
Saunders & Frisch, Polyurethanes, Part II, Interscience, N.Y. 1964, pp. 571–583.
Chem. Abstracts, vol. 64, 1966, cols. 18781–18782.

*Primary Examiner*—H.S. Cockeram
*Attorney, Agent, or Firm*—L. Bruce Stevens

[57] ABSTRACT

In a process for data signal recording in which a recording medium is impinged upon by an intensity-modulated, focused laser beam to form a hole in at least one layer of the recording medium, the improvement wherein at least one layer of the recording medium comprises a polymer capable of undergoing residue-free depolymerization and the laser beam is of sufficient intensity to effect said depolymerization.

1 Claim, No Drawings

SOLID SOLDERABLE POLYURETHANE DATA SIGNAL RECORDING MEDIUM

This is a continuation of application Ser. No. 409,515, filed Oct. 25, 1973 now abandoned, which is a continuation of application Ser. No. 864,160, filed Oct. 6, 1969.

BACKGROUND OF THE INVENTION

This invention pertains to thermographic recording using laser radiation, and to a system of forming holes in data cards for storage and retrieval of information.

Previously, an apparatus for data signal recording with a laser beam was described in U.S. Pat. No. 3,256,524 issued June 14, 1966 to N. L. Stauffer. It employed a thin film coated with aluminum or other materials of lower heat of vaporization as the recording medium in which holes were produced by laser irradiation. A similar application has been described in Scientific Research, July 21, 1969, page 27, using data cards for a mass memory system. In the latter process, digital information is recorded by burning holes through plastic cards upon irradiation with focused laser radiation.

A system for recording data employing a film having a black coating and a laser was described in U.S. Pat. No. 3,314,073 issued Apr. 11, 1967 to C. H. Becker. The coating consisted of fully developed gelatin photographic emulsion or dyed gelatin.

SUMMARY OF THE INVENTION

An object of the invention is to provide an improvement in the process of data recording wherein the laser-irradiated coating vaporizes cleanly and without residue. A further object is to provide plastic film or sheet which is capable of being pierced by a laser beam cleanly and without residue.

Another object is to provide devices that require less energy to effect recording and will therefore allow recording at higher speed or at a lower laser output power level. Still another object is to provide inexpensive recording media for the storage of machine-readable information.

These and other objects hereinafter defined are met by the invention wherein there is provided a recording medium for data signal recording comprising a solid depolymerizable polymer, i.e. a polymer capable of undergoing residue-free depolymerization.

Polymers available for this purpose include poly(methyl methacrylate), polyoxymethylene, polytetrafluoroethylene, poly($\alpha$-methyl styrene) and polychlorotrifluoroethylene. It is characteristic of these polymers that they are thermally degraded upon laser-irradiation by what is believed to be a "depolymerizable" process so that they revert to their monomeric state. Since their monomers, e.g. methyl methacrylate, formaldehyde, etc, are gases at the surface temperature of the plastics in the irradiated area, no solid or molten residues remain from the degradation.

There may also be employed certain urethane formulations known in the art as solderable urethane wire enamels, see Polyurethanes, Part II Technology, Interscience Publishers, N.Y., 1964, Saunders and Frisch, pp. 580–582. These may be formulated as solutions of Mondur® S, a blocked polyisocyanate hereinafter described, and either Multron® R-2 or R-4, polyesters hereinafter described, applied and cured to form depolymerizable polymers. Curing conditions may be varied, as known in the art, usually employing temperatures up to 400° C. for a short period of time, e.g. 30–60 seconds at 290°–350° C.

Instead of the preferred depolymerizable polymers named herein, there may be employed less effectively the copolymers of their respective monomers, e.g. trifluoronitrosomethane/tetrafluoroethylene; trifluoronitrosomethane/chlorotrifluoroethylene; vinylidene fluoride/chlorotrifluoroethylene; etc. There may also be employed related polymers including perfluoropropylene, poly($\alpha,\beta,\beta$-trifluorostyrene), poly($p$-xylylene), poly($p$-tetramethyl phenylenemethylene), poly($p$-2,5-dimethyl phenylenemethylene), and poly($p$-tetramethyl phenylenemethylene).

Previous to conducting the present experiments, it was not known whether evolving vapors might undergo reactions in the vapor phase, while escaping through the path of the focused laser beam, and yield products that would deposit on the polymer surface, or whether evolving monomer vapors, while escaping through the path of the focused laser beam, might be converted to reactive molecular species that, upon reaction with the recording media material would cause reduction of formed hole definition.

Although the recording medium of this invention must contain at least one depolymerizable polymer, it has been found that it may also contain minor proportions of other materials without adverse effect. Thus, there may be present: plasticizers, e.g. organic esters, phosphates, etc.; crosslinking agents, e.g. peroxides or difunctional agents up to 10% by weight, etc; reinforcing agents and fillers, e.g. carbon black, fumed silica, etc.; pigments, e.g. titanium dioxide, ferric oxide, etc.; and other materials which are readily removed from the irradiated zone as gaseous or particulate matter.

Optimum energy utilization and high hole-forming speed can be attained with materials of the present invention by using plastic matrix and additive materials that yield compositions of high absorbence at the emission wavelength of the laser used for data recording. Conversely, lasers emitting at any wavelength may be employed as long as the energy absorbed is sufficient in intensity to cause depolymerization and removal of the plastic in the irradiated region.

To achieve high information storage capacities, it is advantageous to effect recording with an ultraviolet or visible laser source. Storage capacities in excess of $10^6$ bits per square inch are attainable by effecting the recording with argon laser radiation, whereas the corresponding figure for recording with $CO_2$ laser radiation is approximately $10^5$ bits per square inch.

In view of the chemical specificity of the reaction upon which the recording process is based, and the laser beam intensity control available by means of electrooptic devices, both digital and analog data can be recorded.

The recorded information can be retrieved with optical scanning and other optical readout devices, using high-speed photo-detectors as signal sensors. The readout beam intensity is much lower than that of the recording beam. Desired optical characteristics for readout purposes can be attained in the polymeric recording media by incorporation of materials capable of absorbing the laser radiation, e.g. dyes or finely divided pigments, at low concentrations, e.g. less than 10%.

This invention is directed to improved coatings on a film substrate for laser-recording purposes. It is also directed to providing improved recording media in the form of plastic films, sheets, cards, discs, etc. for information storage and retrieval in mass memory systems. In the latter, the information is stored in form of open apertures or areas of different optical diameters. The film, sheets, cards, discs, etc. of the recording devices are fabricated from the preferred polymer system. When the recording is done by an intensity-modulated laser beam, especially clean and residue-free holes are formed rapidly because of low energy requirements. Read-out is substantially error-free because of the clean and uniform shape of the holes.

In its various applications, the invention will yield a hole in a coating layer of depolymerizable polymer on a substrate film, in effect a pit through the coating; or it will yield an aperture through a film or sheet fabricated from the depolymerizable polymer as a single-layered structure. One application of poly(methyl methacrylate) sheet having such openings produced by a laser is as a stencil in an electrostatic printing process described in Netherlands Application No. 6,509,964 of January 31, 1966 of Continental Can company, Inc. (Chemical Abstracts 64, column 18782α).

Cofiled applications related to the subject include "Engraved Article", Ser. No. 864,162, filed Oct. 6, 1969, and now abandoned; "Screen-Printing Stencil", Ser. No. 864,161, filed Oct. 6, 1969, now U.S. Pat. No. 3,696,742; and "Engraved Rigid polymeric Compositions", Ser. No. 864,215, filed Oct. 6, 1969, now abandoned.

DESCRIPTION OF THE PREFERRED EMBODIMENTS

The invention is further illustrated by, but not limited to, the following examples.

EXAMPLE 1

A coating of poly(methyl methacrylate) was applied to a ⅛ inch thick sheet of plastic: a solution containing 25% by weight of poly(methyl methacrylate) and 1% of the dye Oil Red O (Allied Chemical Company) in toluene was applied and the solvent evaporated to leave approximately 0.001 inch coating. The coated plastic was subjected to $CO_2$ laser radiation at the focal point of a 6 inch water-cooled germanium lens. The power output ranged from 0.3 to 1.75 watts.

The beam was intensity-modulated by electromechanical means so that, as the plastic sheet moved across the path of the beam, there was formed a series of dots engraved in its surface. Visibility was excellent because of the tinted coating contrasting with transparent underlying substrate. The substrate was not visibly damaged.

EXAMPLE 2

A coating of poly(methyl methacrylate) was applied to a 0.010 inch sheet of polyester ("Mylar", E. I. du Pont de Nemours and Company, Inc.): a solution containing 25% by weight of poly(methyl methacrylate) and 1% of Oil Black BT (Allied Chemical Company) in toluene was applied and the solvent evaporated, leaving approximately 0.001 inch coating. The coated plastic was subjected to focused $CO_2$-laser irradiation of about 1 watt power output. Using electromechanical means for beam intensity modulation, a series of dots was obtained on the sheet as it was moved across the path of the beam. The substrate was not visibly attacked by the beam. Light passed readily through the polyester sheet at each dot.

EXAMPLE 3

Sheets of poly(methyl methacrylate), polyoxymethylene, polytetrafluoroethylene, poly(α-methyl styrene) and polychlorotrifluoroethylene of about 0.002–0.010 inch thickness are subjected separately to a spot of focused $CO_2$-laser irradiation approximately 0.25 mm. in diameter at about 1 watt power output. Within a very short time there is formed a hole, cleanly and free of residue or debris. If the sheet contains a homogeneously dispersed dye, is pigmented, or covered with an opaque coating, light passes unhindered only through the hole.

EXAMPLE 4

Solderable urethane enamels are prepared as follows, using typical formulations known in the art, e.g. Polyurethanes, part II Technology, Interscience Publishers, N.Y., 1964, Saunders and Frisch, pp. 580–582; and Technical Information Bulletin, No. 71-C20, "Urethane Finishes for the Electrical Industry", Mobay Chemical Co., Pittsburgh, Pennsylvania.

| Formulation | A | B | C | D |
| --- | --- | --- | --- | --- |
| Mondur ® S | 324.5 | 324.5 | 333.5 | 333.5 |
| Multron ® R-2 | 154.5 | 154.5 | 166.5 | 166.5 |
| Polyamide | 24.0 | 24.0 | — | — |
| Cresylic acid | 204.0 | 347.0 | 207.0 | 500.0 |
| Methyl glycol acetate | 146.0 | — | 146.0 | — |
| Butyl acetate | 28.0 | — | 28.0 | — |
| Toluene | 119.0 | — | 119.0 | — |
| High flash naphtha | — | 150.0 | — | — |
| Total weight | 1000.0 | 1000.0 | 1000.0 | 1000.0 |
| Percent total solids | 50.3 | 50.3 | 50.0 | 50.0 |

All parts shown are by weight.

Mondur ® S is a blocked polyisocyanate adduct described by Mobay Chemical Company, Pittsburgh, Pa., in their Data Sheet of Nov. 1, 1967 as having approximately 95% total solids, 11.5–13.5% available NCO, and a specific gravity equal to 1.26–1.28 at 25°/25° C.

Multron ® R-2 is a polyester resin described by Mobay Chemical Company in their Data Sheet of November 1, 1967 as having a hydroxyl number (corrected) of 390–420, an acid number of 6.8–9.0, a specific gravity equal to approximately 1.26 at 25°/15.5° C., and a viscosity of 800–1100 centipoises for 70% solids in methyl cellosolve ® acetate at 25° C.

The polyamide is a soluble nylon, e.g., Zytel ® "61", E. I. du Pont de Nemours and Company, Inc., now called "Elvamide 8061" as described in the du Pont Technical Information Bulletin PM 1-1165 on "Elvamide ® Polyamide (Nylon) Resins."

Multron R-2 may be replaced by Multron ® R-4, using about 42 parts of Multron R-4 for each 100 parts of Mondur S. Multron R-4 is a polyester resin described by Mobay Chemical Company in their Data Sheet of November 1, 1967 as having a hydroxyl number (corrected) of 270–290, an acid number of 4.0 maximum, a specific gravity equal to approximately 1.13 at 25°/15.5° C., and a viscosity of 2000–3000 centipoises at 73° C.

In a typical application of this invention, a solderable urethane enamel is applied to the film substrate of the recording medium and subsequently cured at temperatures up to 400° C., the curing conditions being governed by the physical and chemical stability of the substrate at temperature. For example a thin layer of enamel is adequately cured at 290°–350° C. within 30–60 seconds. If Multron R-4 is used, lower curing temperatures are usually employed.

When the solderable urethane coating is exposed to laser radiation as described in the preceding examples, at laser outputs up to 10 watts, the irradiated portions are depolymerized and cleanly removed without residue.

What we claim is:

1. In a process for data signal recording in which a recording medium is impinged upon by an intensity-modulated, focused laser beam to form a hole in at least one layer of the recording medium, the improvement wherein said one layer of the recording medium comprises a solid, solderable polyurethane polymer having the capability for undergoing residue free depolymerization when subjected to laser irradiation, said solderable polyurethane polymer being the heat-cured reaction product of a blocked polyisocyanate adduct having from 11.5 to 13.5 percent available NCO, and a polyester having a hydroxyl number of from 270 to 420 and an acid number of from 4.0 to 9.0, and the beam is of sufficient intensity to effect said depolymerization.

* * * * *